(12) United States Patent
Shimada

(10) Patent No.: US 7,675,570 B2
(45) Date of Patent: Mar. 9, 2010

(54) DEVICE MOUNTING APPARATUS, ADJUSTMENT JIG, AND IMAGE PICKUP APPARATUS WITH ADJUSTMENT MECHANISM

(75) Inventor: Tsutomu Shimada, Musashino (JP)

(73) Assignee: Canon Kabushiki Kaisha, Tokyo (JP)

( * ) Notice: Subject to any disclaimer, the term of this patent is extended or adjusted under 35 U.S.C. 154(b) by 548 days.

(21) Appl. No.: 11/488,478

(22) Filed: Jul. 18, 2006

(65) Prior Publication Data

US 2007/0019947 A1 Jan. 25, 2007

(30) Foreign Application Priority Data

Jul. 25, 2005 (JP) ............................. 2005-214897

(51) Int. Cl.
*H04N 5/335* (2006.01)
*H04N 5/225* (2006.01)
*G03B 35/00* (2006.01)
*G03B 17/00* (2006.01)

(52) U.S. Cl. .................. 348/373; 348/207.11; 396/329; 396/427

(58) Field of Classification Search ................. 348/373, 348/81, 207.11; 396/427, 428, 329; 248/917
See application file for complete search history.

(56) References Cited

U.S. PATENT DOCUMENTS

| | | | | |
|---|---|---|---|---|
| 3,999,328 A | * | 12/1976 | Schroeder | 446/50 |
| 4,673,268 A | * | 6/1987 | Wheeler et al. | 352/243 |
| 4,889,516 A | * | 12/1989 | Auer et al. | 446/462 |
| 5,627,616 A | * | 5/1997 | Sergeant et al. | 396/427 |
| 6,272,290 B1 | * | 8/2001 | Mogamiya | 396/59 |
| 6,503,000 B1 | * | 1/2003 | Kim | 396/427 |
| 6,628,338 B1 | * | 9/2003 | Elberbaum et al. | 348/373 |
| 6,992,723 B1 | * | 1/2006 | Wulf et al. | 348/374 |
| 7,224,398 B2 | * | 5/2007 | Wada | 348/373 |
| 7,387,453 B2 | * | 6/2008 | Arbuckle | 396/419 |
| 2004/0012360 A1 | * | 1/2004 | Yuen | 318/560 |
| 2004/0184798 A1 | * | 9/2004 | Dumm | 396/428 |
| 2004/0223062 A1 | * | 11/2004 | Pettegrew et al. | 348/211.4 |
| 2006/0147194 A1 | * | 7/2006 | Jones | 396/427 |
| 2007/0201862 A1 | * | 8/2007 | Van Schaik et al. | 396/427 |

FOREIGN PATENT DOCUMENTS

JP H05-191689 7/1993

* cited by examiner

*Primary Examiner*—David L Ometz
*Assistant Examiner*—Quang V Le
(74) *Attorney, Agent, or Firm*—Cowan, Liebowitz & Latman, P.C.

(57) ABSTRACT

A device mounting apparatus that allows the orientation of a device to be easily adjusted alone. The device mounting apparatus is mounted with a device. A mount includes a seat fixed to a base, and a rotation mechanism portion that is supported by the seat and can change the orientation of the device relative to the seat. An adjustment jig is attachable to and detachable from the mount and includes a driving unit driven by operation. The rotation mechanism includes a supporting unit that supports the device, a changing unit that changes the orientation of the rotation mechanism according to driving of the adjustment jig when the adjustment jig is mounted to the mount, and brakes that fix the orientation of the rotation mechanism when the adjustment jig is detached from the mount.

3 Claims, 8 Drawing Sheets

DEVICE MOUNTING APPARATUS, ADJUSTMENT JIG, AND IMAGE PICKUP APPARATUS WITH ADJUSTMENT MECHANISM

BACKGROUND OF THE INVENTION

1. Field of the Invention

The present invention relates to a device mounting apparatus to which, for example, a device such as an image pickup apparatus used for monitoring is mounted, an adjustment jig, and an image pickup apparatus with an adjustment mechanism.

2. Description of the Related Art

There has been proposed an example of mounting a monitoring camera to a ceiling or a wall and adjusting the orientation of the camera (for example, see Japanese Laid-Open Patent Publication (Kokai) No. H05-191689). In this proposal, a camera mount to which the camera is mounted is fixed to the ceiling or the like, then an image taken by the camera is monitored through a monitor, and the orientation of the camera is adjusted so that the camera can photograph a predetermined area.

In the conventional example, however, a stepladder or a ladder needs to be used when the orientation of the camera mounted to the ceiling or the like via the camera mount is adjusted, but the monitor cannot be placed on the stepladder or the ladder. This requires two workers of an adjustment operator who adjusts the orientation of the camera and an adjustment indicator who indicates the orientation of the camera to the adjustment operator while watching the monitor. The adjustment indicator who watches the monitor and the adjustment operator who adjusts the orientation of the camera are different, and therefore a communication is mixed up to thereby cause trouble in adjustment. Further, fine adjustment of the orientation of the camera is difficult, and for a camera with a high magnification zoom lens, the orientation of the camera is sometimes slightly displaced to thereby prevent the camera from photographing a place to be photographed.

SUMMARY OF THE INVENTION

It is an object of the present invention to provide a device mounting apparatus, an adjustment jig, and an image pickup apparatus with an adjustment mechanism that allow the orientation of a device to be easily adjusted alone.

To attain the above object, in a first aspect of the present invention, there is provided a device mounting apparatus to which a device is mounted comprising a mount including a fixed unit fixed to a base, and a movable unit that is supported by the fixed unit and can change the orientation of the device relative to the fixed unit, and an adjustment jig that is attachable to and detachable from the mount and includes a driving unit driven by operation, wherein the movable unit includes a supporting unit that supports the device, a changing unit that changes the orientation of the movable unit according to driving of the adjustment jig when the adjustment jig is mounted to the mount, and a fixing unit that fixes the orientation of the movable unit when the adjustment jig is detached from the mount.

Preferably, the adjustment jig performs any of first driving and second driving according to remote control, the changing unit includes a first rotation mechanism unit that rotates the supporting unit in a direction substantially parallel to a surface of the base in the first driving when the adjustment jig is mounted to the mount, and a second rotation mechanism unit that rotates the supporting unit in a direction substantially perpendicular to the surface of the base in the second driving when the adjustment jig is mounted to the mount, and the fixing unit includes a rotation preventing unit that prevents rotation of the supporting unit caused by the first rotation mechanism unit and the second rotation mechanism unit when the adjustment jig is not mounted to the mount.

Also preferably, the device is mounted to the mount by the supporting unit in a manner selected from the group consisting of a manner in which the device is integrated into the mount, and a manner in which the device is separatable from the mount.

Preferably, the device is selected from the group consisting of an image pickup apparatus and an illumination apparatus.

To attain the above object, in a second aspect of the present invention, there is provided an adjustment jig attachable to and detachable from a mount included in a device mounting apparatus to which a device is mounted, the adjustment jig comprising a fixed unit fixed to a base, a movable unit that is supported by the fixed unit and can change the orientation of the device relative to the fixed unit, a driving unit driven by operation, and a changing unit that changes the orientation of the movable unit according to driving of the driving unit when the adjustment jig is mounted to the mount.

Preferably, the driving unit performs any of first driving and second driving according to remote control, and the changing unit includes a first rotation mechanism unit that rotates the movable unit in a direction substantially parallel to a surface of the base in the first driving when the adjustment jig is mounted to the mount, and a second rotation mechanism unit that rotates the movable unit in a direction substantially perpendicular to the surface of the base in the second driving when the adjustment jig is mounted to the mount.

Also preferably, the adjustment jig further comprises a communication unit that receives the contents of remote control, and a releasing unit that releases the adjustment jig from the mount according to the remote control.

To attain the above object, in a third aspect of the present invention, there is provided an image pickup apparatus with an adjustment mechanism comprising a mount including a fixed unit fixed to a base, and a movable unit that is supported by the fixed unit and of which orientation can be changed relative to the fixed unit, and an adjustment jig that is attachable to and detachable from the mount and includes a driving unit driven by operation, wherein the movable unit includes a supporting unit that supports a device, a changing unit that changes the orientation of the movable unit according to driving of the adjustment jig when the adjustment jig is mounted to the mount, and a fixing unit that fixes the orientation of the movable unit when the adjustment jig is detached from the mount.

The above and other objects, features, and advantages of the invention will become more apparent from the following detailed description taken in conjunction with the accompanying drawings.

DETAILED DESCRIPTION OF THE PREFERRED EMBODIMENTS

The present invention will now be described in detail with reference to the drawings showing preferred embodiments thereof. It should be noted that the relative arrangement of the components, the numerical expressions and numerical values set forth in these embodiments do not limit the scope of the present invention unless it is specifically stated otherwise.

Now, embodiments of the present invention will be described with reference to the drawings.

First, a description will be given of a first embodiment of the present invention.

Figure 1A:
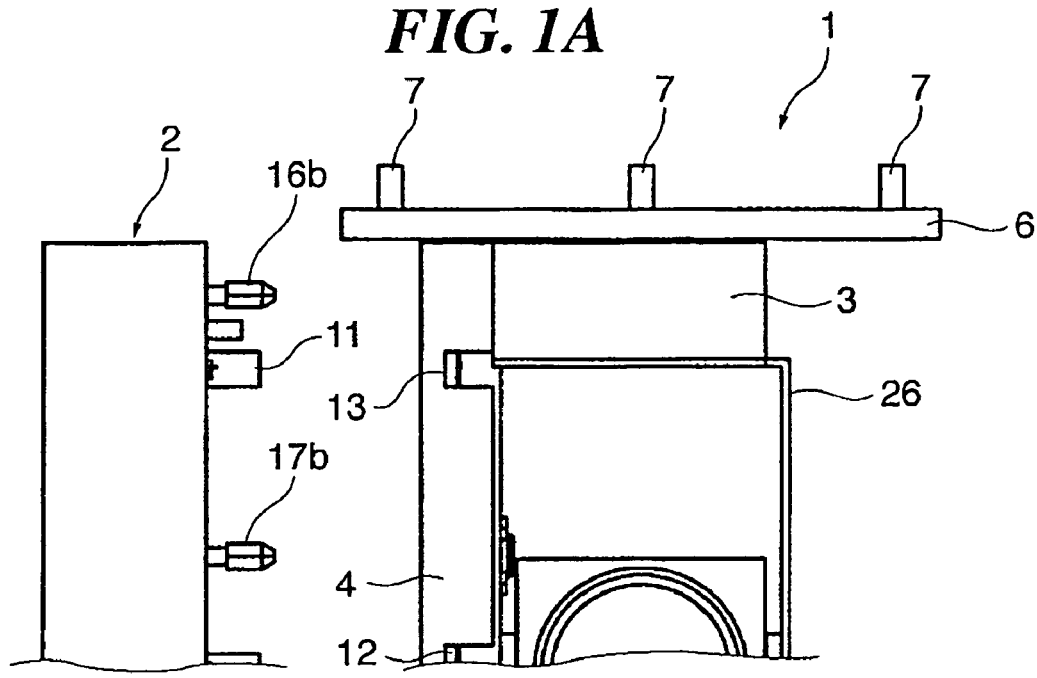
FIG. 1A is a front view of configurations of a mount as a device mounting apparatus, a camera unit as an image pickup apparatus with an adjustment mechanism, and an adjustment jig according to a first embodiment of the present invention.
Figure 1B:
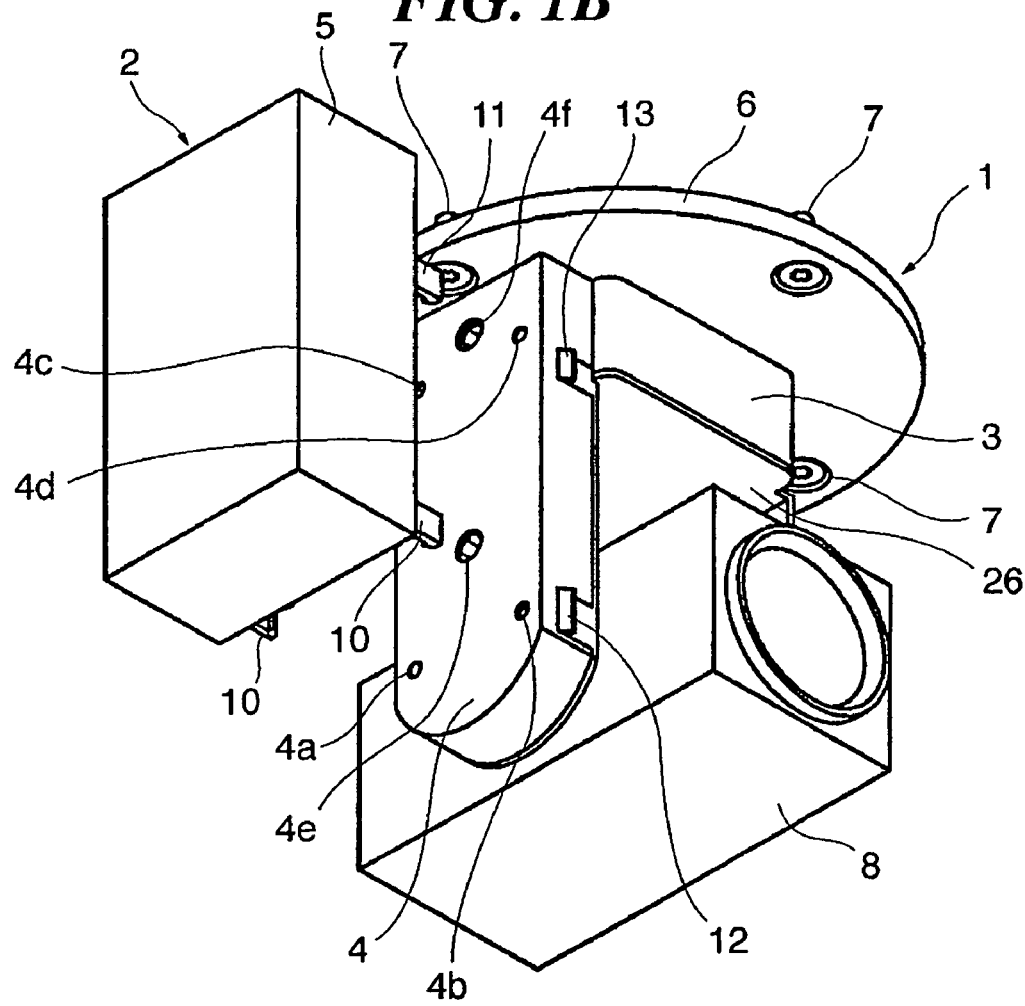
FIG. 1B is a perspective view of the mount, the camera unit, and the adjustment jig in FIG. 1A as viewed from the lower left.

FIG. 1A is a front view of configurations of a mount 1 as a device mounting apparatus, a camera unit 8 as an image pickup apparatus with an adjustment mechanism, and an adjustment jig 2 according to the first embodiment of the present invention, and FIG. 1B is a perspective view of the mount 1, the camera unit 8, and the adjustment jig 2 in FIG. 1A as viewed from the lower left.

First, outlines of the mount 1, the adjustment jig 2, and the camera unit 8 will be described.

In FIG. 1A, the camera unit 8 is integrated into the mount 1, and the mount 1 includes an upper cover 3, a side cover 4, a seat 6, a chassis 26, or the like. The seat 6 is, for example, a disk-shaped member that constitutes a fixing portion of the mount 1, and fixed to a base such as a ceiling or a wall by, for example, four screws 7. The chassis 26 includes a flat plate portion disposed under the seat 6 in parallel with the seat 6 and two vertical plate portions perpendicular to the seat 6, and is rotatable via a shaft 27 described later in FIG. 4. On a vertical plate portion of the chassis 26 on the side to which the adjustment jig is attached, a pair of pawls 12 and a pair of pawls 13 (see FIG. 4) are disposed on longitudinally opposite sides thereof.

Figure 4:
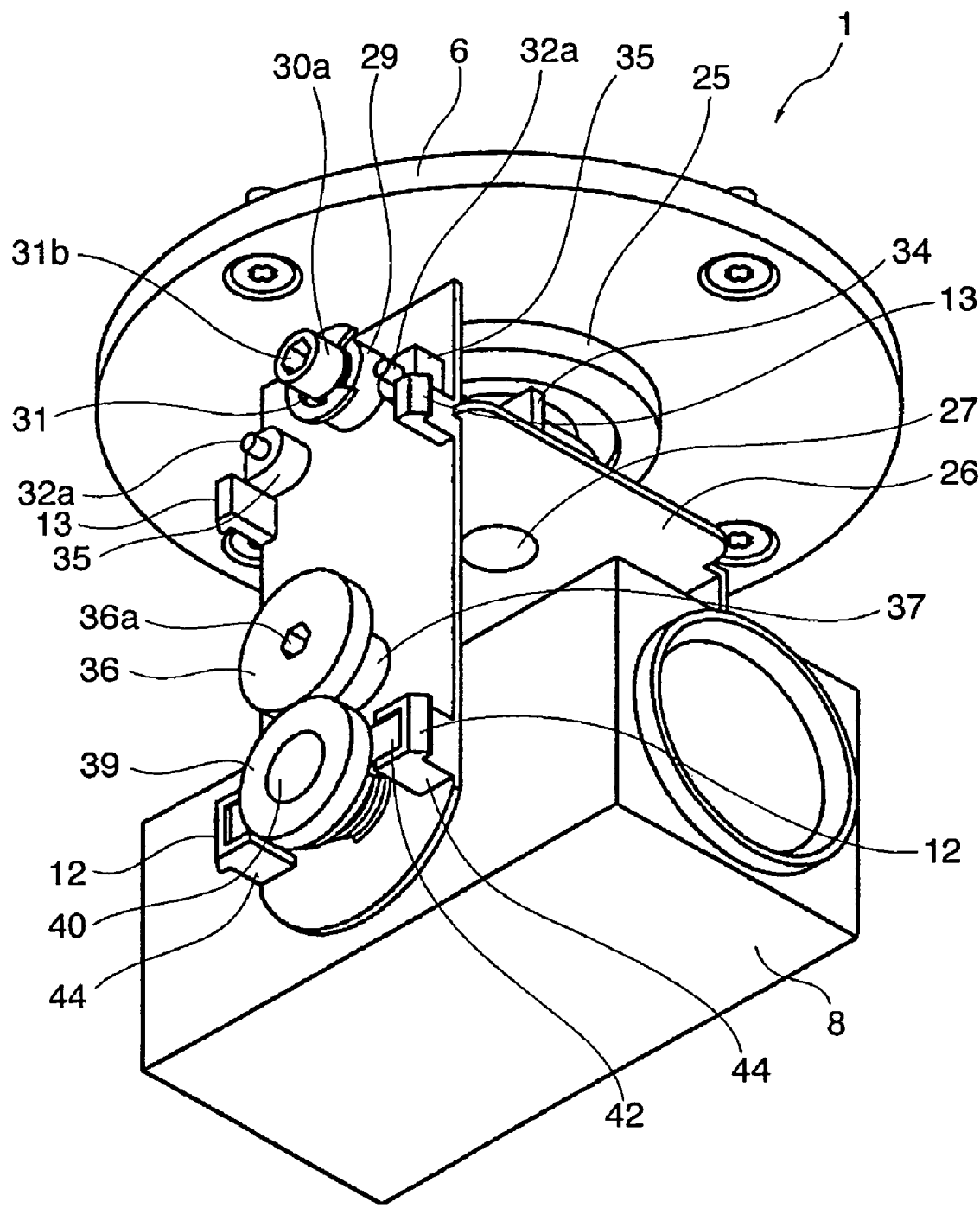
FIG. 4 is a perspective view of the mount with an upper cover and a side cover being removed, as viewed from the lower left.

The upper cover 3 is disposed under the seat 6 and mounted to the chassis 26, and covers part of a horizontal rotation mechanism portion (a mechanism including a bevel gear 25, the chassis 26, and the shaft 27 in FIG. 4). The side cover 4 is disposed on a lateral side of the upper cover 3, and mounted to the chassis 26, and covers part of a vertical rotation mechanism portion (a mechanism including a gear 36, a gear 39, a shaft 40, and a shaft 45 in FIG. 4) and part of a horizontal rotation mechanism portion (a mechanism including a bevel gear 30 in FIG. 4). In the side cover 4, for example, six holes 4a, 4b, 4c, 4d, 4e and 4f (see FIG. 1B) are formed.

The camera unit 8 is integrated into the mount 1, installed on the base such as the sealing or the wall via the seat 6 of the mount 1, photographs a predetermined space area such as an area to be monitored, and includes a lens and a camera portion (not shown). Electric power is supplied from a battery to the camera unit 8 via an unshown power supply cable or an Ethernet (registered trademark) cable, and the camera unit 8 is connected to a network. An image photographed by the camera unit 8 is transmitted to a predetermined place (for example, a monitor room) via the network.

The adjustment jig 2 is configured to be attachable to and detachable from the mount 1 and to be driven by remote control mounted to the mount 1 in adjusting the orientation of the camera unit 8, and covered with a cover 5. The adjustment jig 2 can adjust the orientation of the camera unit 8 in two directions of a direction substantially parallel to a surface of the base such as the ceiling or the wall to which the seat 6 of the mount 1 is fixed and a direction substantially perpendicular to the surface of the base.

On one surface of a base plate 15 described later of the adjustment jig 2, a pair of pawls 10 and a pair of pawls 11 are disposed in a protruding manner in a mounting direction (see FIG. 2A and FIG. 2B). The pawls 10 and the pawls 11 of the adjustment jig 2 are configured to engage the pawls 12 and the pawls 13 of the mount 1, respectively, when the adjustment jig 2 is mounted to the mount 1. Thus, the adjustment jig 2 is fixed to the mount 1.

Next, a specific configuration of the adjustment jig 2 will be described.

Figure 2A:
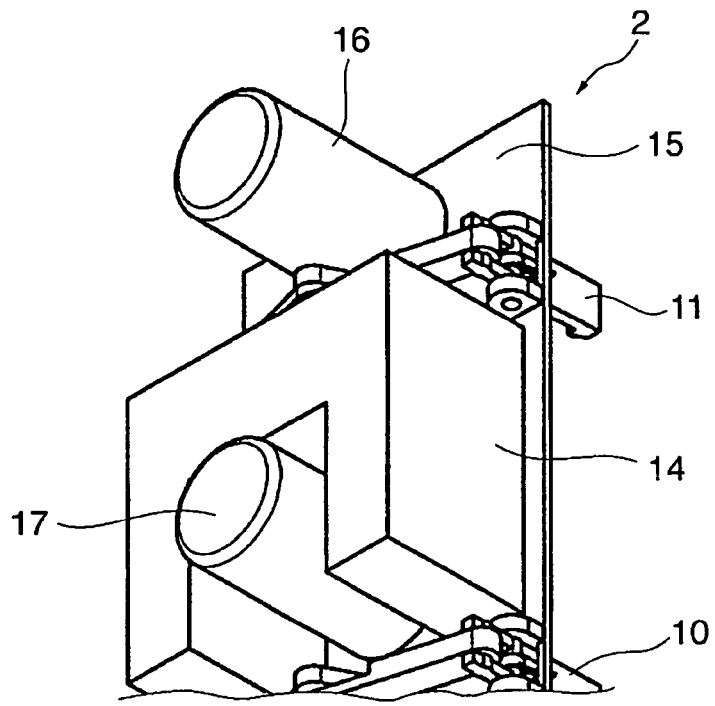
FIG. 2A is a perspective view of the inside of the adjustment jig with a cover being removed, as viewed from the lower left.
Figure 2B:
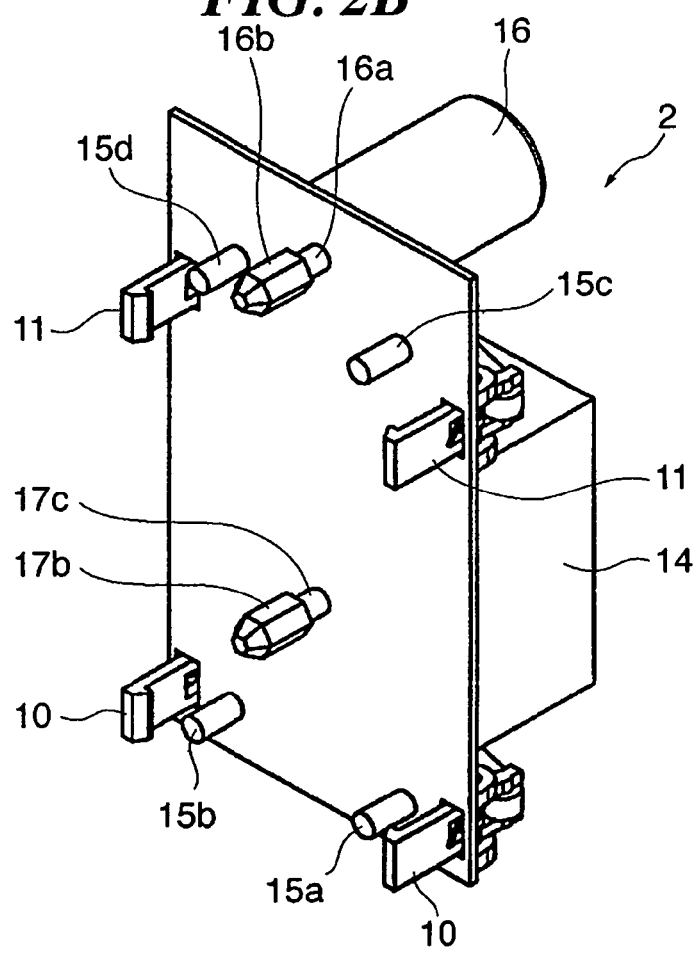
FIG. 2B is a perspective view of the inside of the adjustment jig with the cover being removed, as viewed from the upper right.

FIG. 2A is a perspective view of the inside of the adjustment jig 2 with the cover 5 being removed, as viewed from the lower left, and FIG. 2B is a perspective view of the inside of the adjustment jig 2 with the cover 5 being removed, as viewed from the upper right.

In FIG. 2A and FIG. 2B, the adjustment jig 2 includes an electric unit 14, the base plate 15, a pan motor 16, and a tilt motor 17. On the one surface of the base plate 15 (the surface to be mounted to the mount 1), the pair of pawls 10, the pair of pawls 11, a shaft 15a, a shaft 15b, a shaft 15c, a shaft 15d, a hexagonal shaft 16b, and a hexagonal shaft 17b are disposed. On the other surface of the base plate 15, the electric unit 14, the pan motor 16, and the tilt motor 17 are fixed.

The electric unit 14 incorporates an unshown battery, a motor driver, a radio transmitting and receiving portion (communication means), a controller portion, or the like. The battery supplies electric power for driving the pan motor 16 and the tilt motor 17. The motor driver drives the pan motor 16 and the tilt motor 17. The radio transmitting and receiving portion transmits and receives radio signals to and from, for example, a monitor room when an adjustment operator in the monitor room drives the pan motor 16 and the tilt motor 17 from a distance by remote control. The controller portion collectively controls the battery, the motor driver, and the radio transmitting and receiving portion.

The pan motor 16 is driven by the motor driver under the control of the controller portion of the electric unit 14 when the orientation of the camera unit 8 is adjusted by the adjustment jig 2 mounted to the mount 1, to rotate the camera unit 8 in a horizontal direction substantially parallel to the surface of the seat 6 (when the seat 6 is fixed to the ceiling, see FIG. 1B). The tilt motor 17 is driven by the motor driver under the control of the controller portion of the electric unit 14 when the orientation of the camera unit 8 is adjusted by the adjustment jig 2 mounted to the mount 1, to rotate the camera unit 8 in a vertical direction substantially perpendicular to the surface of the seat 6 (when the seat 6 is fixed to the ceiling, see FIG. 1B).

The pan motor 16 and the tilt motor 17 are configured as geared motors, and integrally provided with gear heads, for example, with a gear ratio of 30:1 at tips thereof. The hexagonal shaft 16b is press fitted to an output shaft 16a of the gear head of the pan motor 16. Similarly, the hexagonal shaft 17b is press fitted to an output shaft 17c of the gear head of the tilt motor 17.

When the seat 6 is fixed to the wall, the pan motor 16 rotates the camera unit 8 in the direction substantially parallel to the surface of the seat 6 (a vertical direction substantially parallel to the wall), and the tilt motor 17 rotates the camera unit 8 in the direction substantially perpendicular to the surface of the seat 6 (a horizontal direction substantially perpendicular to the wall).

Figure 3A:
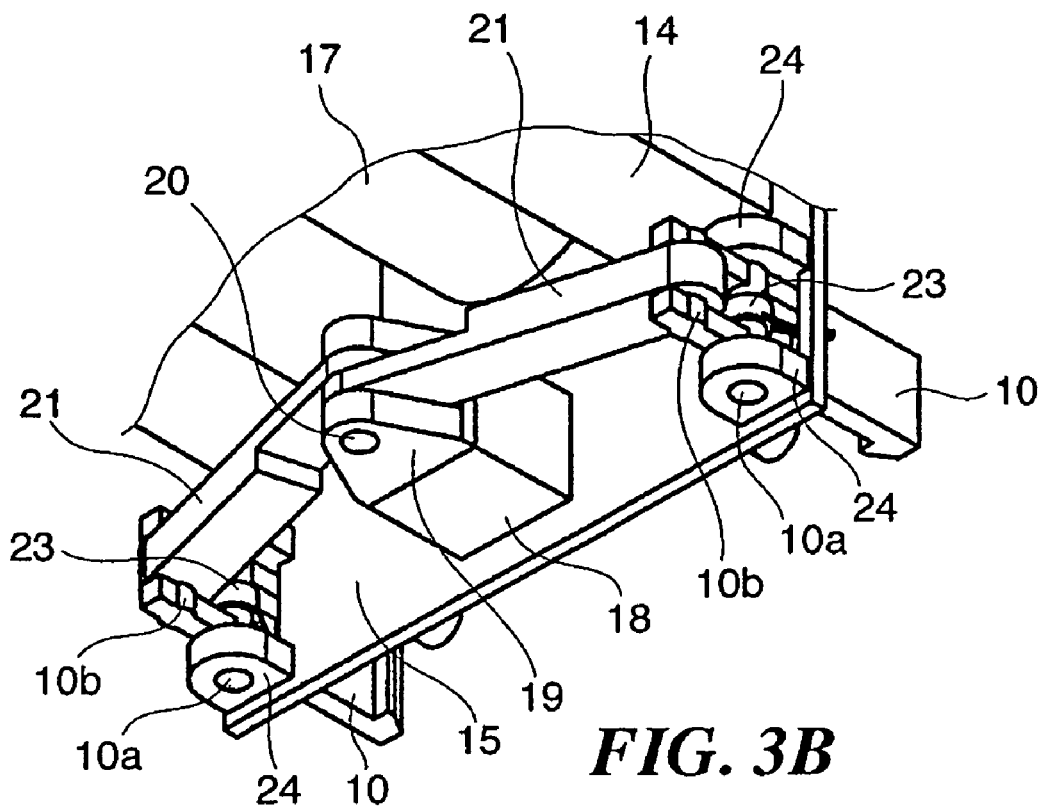
FIG. 3A is a partially enlarged perspective view of related portions including pawls of the adjustment jig.
Figure 3B:
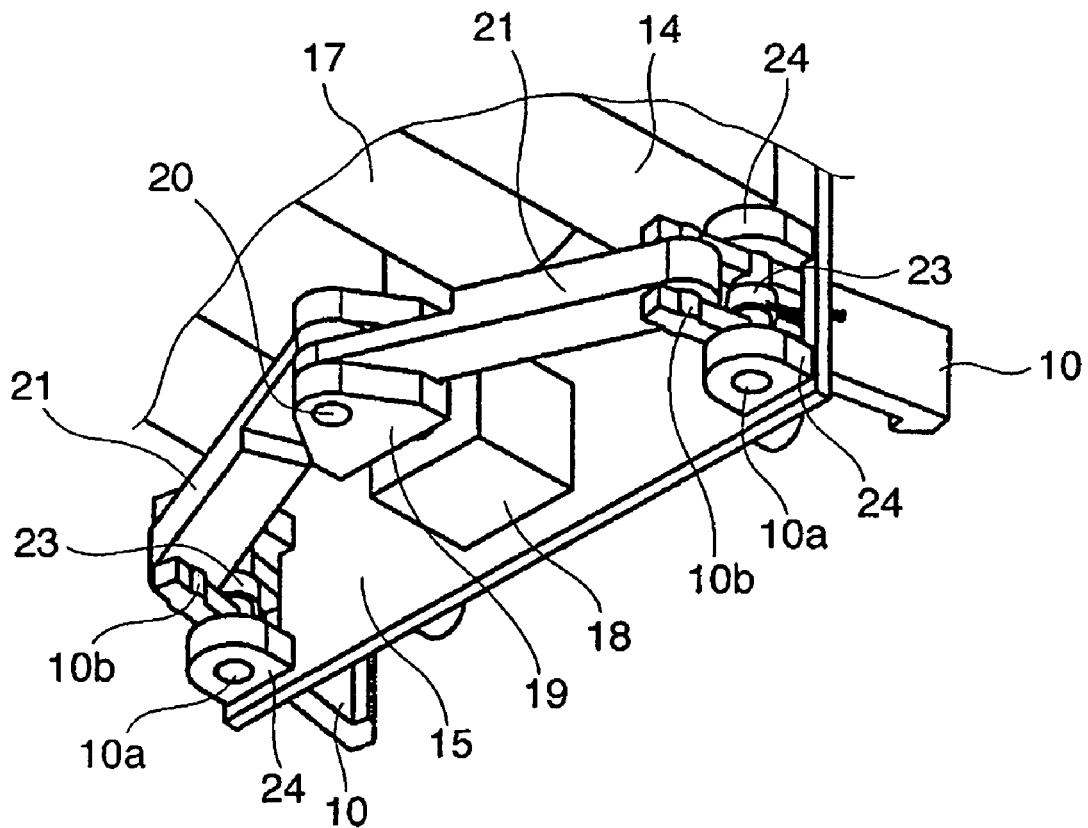
FIG. 3B is a perspective view of the pawls being opened.

FIG. 3A is a partially enlarged perspective view of related portions including the pawls 10 of the adjustment jig 2, and FIG. 3B is a perspective view of the pawls 10 being opened.

In FIG. 3A and FIG. 3B, the adjustment jig 2 includes a solenoid 18, a joint 19, a pair of rods 21, a pair of torsion springs 23, and a pair of bearings 24. The solenoid 18 is fixed to the base plate 15. The joint 19 is mounted to a tip of the solenoid 18, and moved vertically in FIG. 3A and FIG. 3B according to driving of the solenoid 18. A shaft 20 is press fitted into the joint 19.

Each of the pair of pawls 10 disposed on laterally opposite sides of the base plate 15 is integrally provided with a shaft 10a and a shaft 10b. The shaft 10a is rotatably inserted into the bearing 24 fixed to the base plate 15. One end of each rod 21 is rotatably inserted into the shaft 20. The other end of each rod 21 is rotatably coupled to the shaft 10b. The torsion spring 23 is inserted into the shaft 10a. The torsion spring 23 urges the pair of pawls 10 inward (so that the pawls 10 face each other) around the shaft 10a (see FIG. 3A).

When the pair of pawls 10 is opened outward (so that the pawls 10 are away from each other) (see FIG. 3B), the above described mechanism causes the joint 19 to be moved upward in the drawing as in driving the solenoid 18. If the solenoid 18 is driven by remote control, the pawls 10 are also opened outward. Specifically, the adjustment jig 2 mounted to the mount 1 can be detached from the mount 1 by both a manual method and a remote control method. The pawls 10 and the pawls 11 have the same structure, and thus illustrations and descriptions of configurations around the pawl 11 are omitted.

Next, a specific configuration of the mount 1 will be described.

Figure 5:
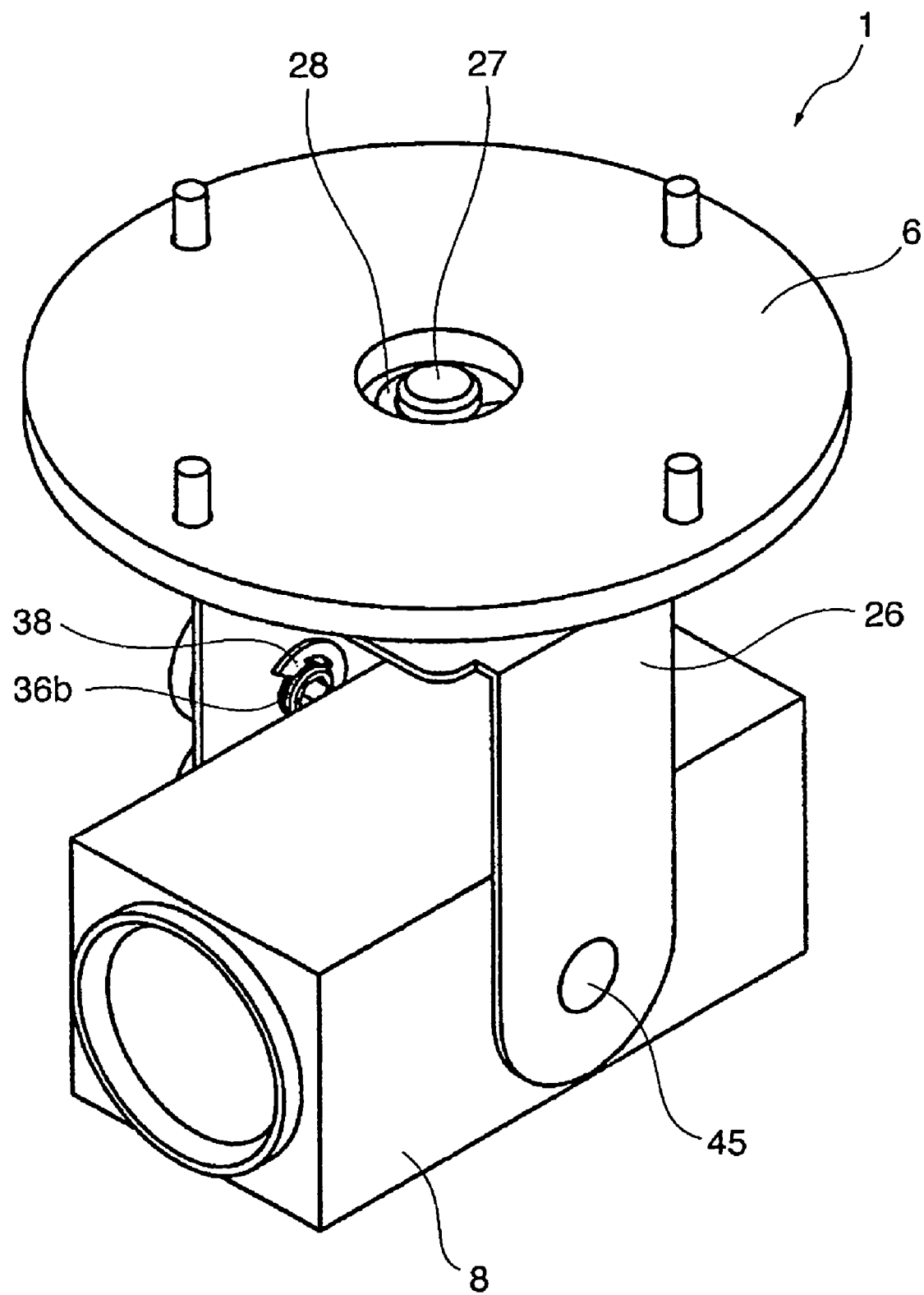
FIG. 5 is a perspective view of the mount with the upper cover and the side cover being removed, as viewed from the upper right.
Figure 6A:
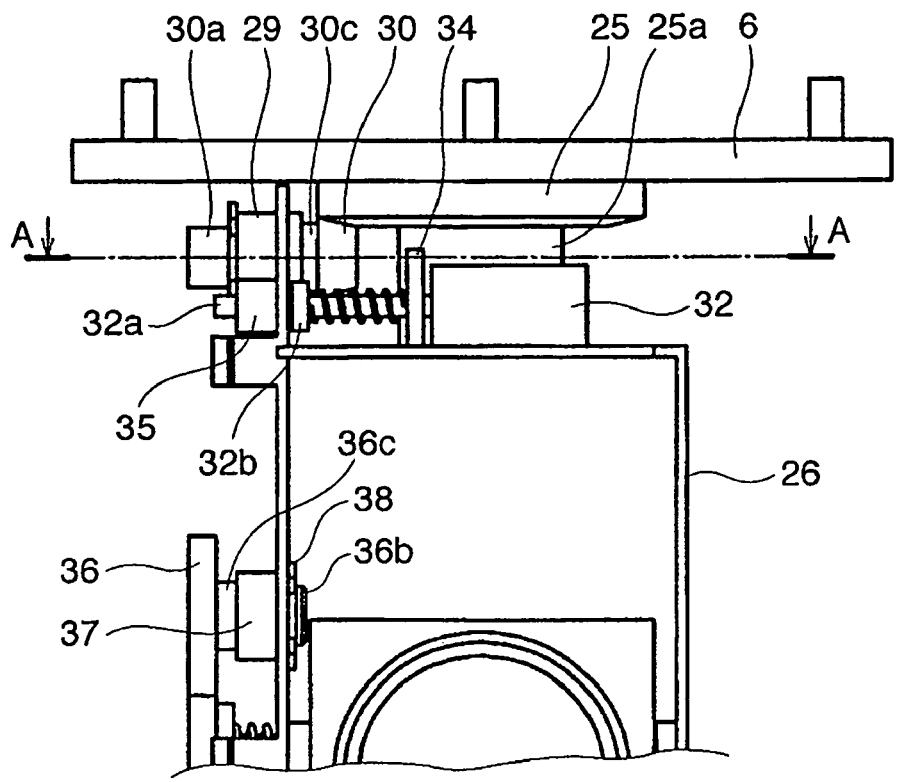
FIG. 6A is a front view of the mount with the upper cover and the side cover being removed.
Figure 6B:
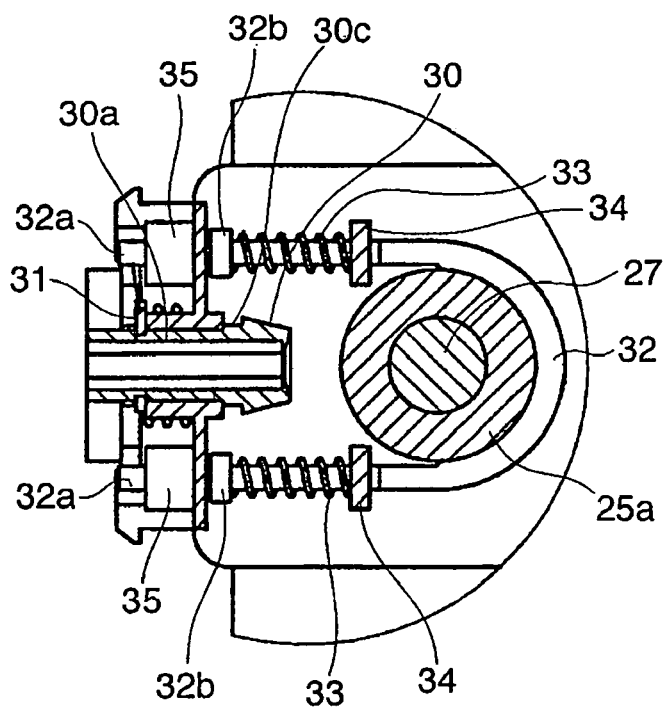
FIG. 6B is a sectional view taken along line A-A in FIG. 6A.
Figure 6C:
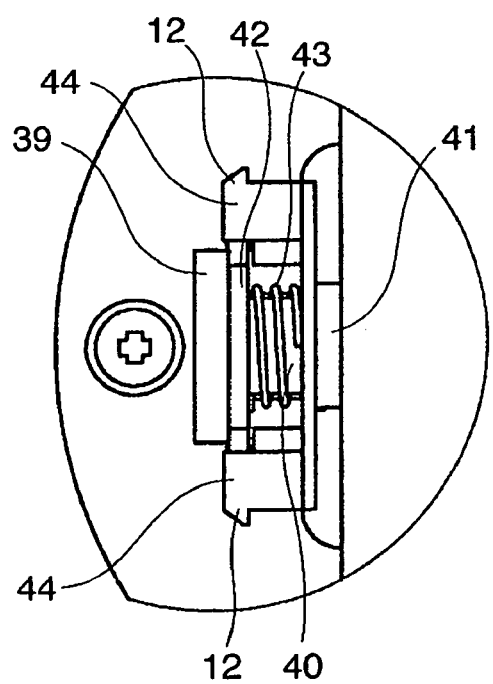
FIG. 6C is a plan view of a gear portion in a state where the upper cover and the side cover of the mount being removed, as viewed from the bottom.

FIG. 4 is a perspective view of the mount 1 with the upper cover 3 and the side cover 4 being removed, as viewed from the lower left. FIG. 5 is a perspective view of the mount 1 with the upper cover 3 and the side cover 4 being removed, as viewed from the upper right. FIG. 6A is a front view of the mount 1 with the upper cover 3 and the side cover 4 being removed, FIG. 6B is a sectional view taken along line A-A in FIG. 6A, and FIG. 6C is a plan view of a gear portion in a state where the upper cover 3 and the side cover 4 of the mount 1 being removed, as viewed from the bottom.

In FIG. 4A to FIG. 6C, the mount 1 includes the above described pawls 12 and 13, the bevel gear 25, a bevel gear 30, a pan brake 32, the gear 36, the gear 39, and a tilt brake 42. The bevel gear 25 is fixed to the seat 6. The shaft 27 is rotatably inserted into the bevel gear 25, and fixed to the flat plate portion of the chassis 26. An E-ring 28 (see FIG. 5) is press fitted to the shaft 27. The E-ring 28 regulates movement of the shaft 27 in a thrust direction. The bevel gear 30 meshes with the bevel gear 25.

The bevel gear 30 is integrally provided with the shaft 30a. The shaft 30a is rotatably inserted into a bearing 29 fixed to the chassis 26, and configured as a stepped shaft having a stepped portion 30c, and an E-ring 31 (see FIG. 6B) is press fitted to the shaft 30a. The stepped portion 30c and the E-ring 31 regulate movement of the shaft 30a in a thrust direction. A hexagonal hole 31b is formed in the shaft 30a (see FIG. 4). When the adjustment jig 2 is mounted to the mount 1, the hexagonal shaft 16b press fitted to the output shaft 16a of the pan motor 16 mounted to the adjustment jig 2 is fitted into the hexagonal hole 31b.

The pan brake 32 regulates horizontal rotation of the mount 1. The pan brake 32 is integrally provided with shafts 32a at opposite ends thereof, respectively (see FIG. 6B). A spring 33 is inserted into each shaft 32a, and each shaft 32a is integrally provided with a stopper 32b. Each shaft 32a is inserted into a bearing 34 and a bearing 35 fixed to the chassis 26. Each spring 33 is compressed between the stopper 32b and the bearing 34, and thus the pan brake 32 is pressed against a boss 25a of the bevel gear 25. Thus, in this state, the chassis 26 cannot be rotated relative to the bevel gear 25.

The gear 36 is integrally provided with a shaft 36b, and the shaft 36b is rotatably inserted into a bearing 37 fixed to the chassis 26. The shaft 36b is configured as a stepped shaft having a stepped portion 36c (see FIG. 6A), and an E-ring 38 is press fitted to the shaft 36b. Movement of the gear 36 in a thrust direction is regulated between the E-ring 38 press fitted to the shaft 36b and the stepped portion 36c of the shaft 36b. A hexagonal hole 36a is formed in the center portion of the gear 36 (see FIG. 4). When the adjustment jig 2 is mounted to the mount 1, the hexagonal shaft 17b press fitted to the output shaft 17c of the tilt motor 17 mounted to the adjustment jig 2 is fitted into the hexagonal hole 36a.

The gear 39 meshes with the gear 36. The gear 39 is press fitted to a shaft 40 integrally provided on the camera unit 8, and the shaft 40 is rotatably inserted into a bearing 41 fixed to the chassis 26 (see FIG. 6C). The camera unit 8 is provided with a shaft 45 coaxially with the shaft 40 (see FIG. 5). The tilt brake 42 is inserted into the shaft 40. The tilt brake 42 is guided by a U-shaped guide portion 44 provided integrally with the pawl 12, and slid along the shaft 40. Further, a spring 43 is inserted into the shaft 40, and thus the tilt brake 42 is pressed against the gear 39. Thus, in this state, the gear 39 cannot be rotated.

Next, the case will be described where the adjustment jig 2 is mounted to the mount 1, and the orientation of the camera unit 8 is adjusted.

Figure 7A:
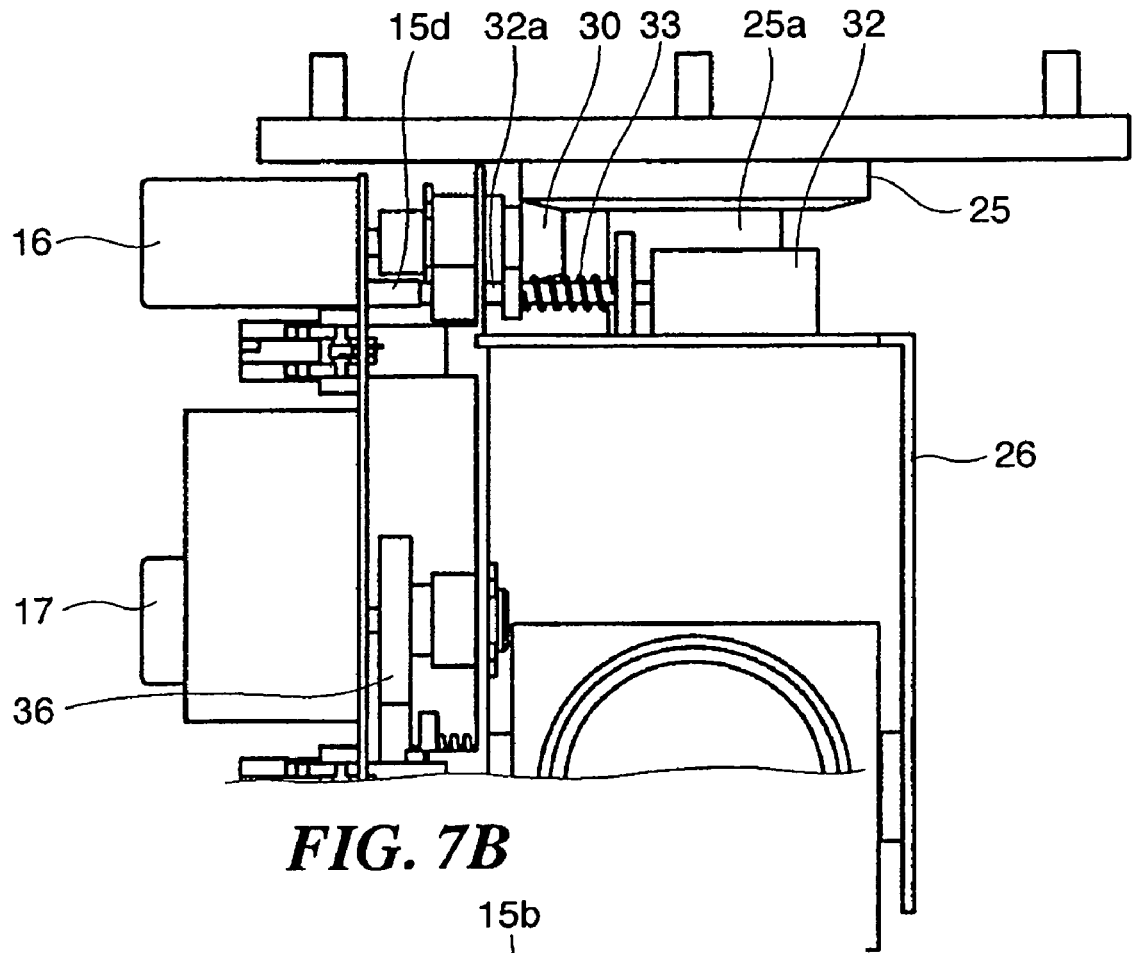
FIG. 7A is a front view of the mount, the camera unit, and the adjustment jig in a state where the adjustment jig is mounted to the mount with covers being removed.
Figure 7B:
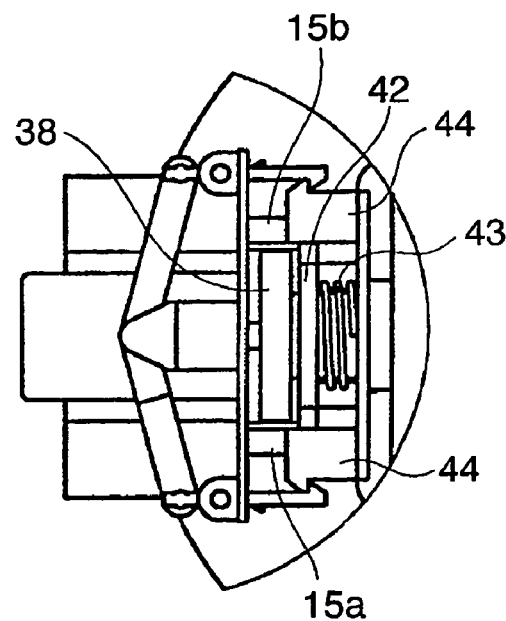
FIG. 7B is a partial plan view of the mount, the camera unit, and the adjustment jig in the state in FIG. 7A as viewed from the bottom.

FIG. 7A is a front view of the mount 1, the camera unit 8, and the adjustment jig 2 in a state where the adjustment jig 2 is mounted to the mount 1 with covers being removed, and FIG. 7B is a partial plan view of the mount 1, the camera unit 8, and the adjustment jig 2 in the state in FIG. 7A as viewed from the bottom.

In FIG. 7A and FIG. 7B, when the adjustment jig 2 is made to face to the mount 1 as shown in FIG. 1A and FIG. 1B and then is mounted to the mount 1, the pawls 10 and 10 of the adjustment jig 2 engage the pawls 12 and 12 of the mount 1, and the pawls 11 and 11 of the adjustment jig 2 engage the pawls 13 and 13 of the mount 1. At this time, the shafts 15a, 15b, 15c and 15d on the base plate 15 are fitted into the holes 4a, 4b, 4c and 4d in the side cover 4 of the mount 1, respectively. Similarly, the hexagonal shaft 17b pressed fitted to the output shaft 17c of the tilt motor 17 on the base plate 15 and the hexagonal shaft 16b press fitted to the output shaft 16a of the pan motor 16 on the base plate 15 are fitted into the holes 4e and 4f, respectively, in the side cover 4 of the mount 1.

Each of the shafts 15a and 15b presses down a portion around the guide portion 44 of the tilt brake 42 against the spring 43 (see FIG. 7B) to thereby separate the tilt brake 42 from the gear 39. Similarly, each of the shafts 15c and 15d presses down the shaft 32a integrally provided on the pan brake 32 against the spring 33 to thereby separate the pan brake 32 from the boss 25a of the bevel gear 25. On the other hand, the hexagonal shaft 16b is fitted into the hexagonal hole 31b in the shaft 30a, and the hexagonal shaft 17b is fitted into the hexagonal hole 36a in the gear 36.

As described above, the adjustment jig 2 is mounted to the mount 1 to thereby separate the tilt brake 42 from the gear 39, and to thereby separate the pan brake 32 from the boss 25a. This makes the chassis 26 and the gear 39 rotatable. Further, the hexagonal shaft 16b is fitted into the hexagonal hole 31b, and the hexagonal shaft 17b is fitted into the hexagonal hole 36a.

Thus, when the pan motor 16 is rotated under the control of the controller portion of the electric unit 14 by remote control in this state, the bevel gear 30 is rotated via the shaft 30a to which the hexagonal shaft 16b coupled to the pan motor 16 is fitted. The bevel gear 25 that meshes with the bevel gear 30 is fixed to the seat 6 and thus not rotated. Thus, the chassis 26 that supports the camera unit 8 is rotated around the shaft 27 rotatably inserted into the bevel gear 25 (horizontally rotated when the seat 6 is fixed to the ceiling).

Similarly to the above operation, when the tilt motor 17 is rotated, the gear 36 to which the hexagonal shaft 17b coupled to the tilt motor 17 is fitted is rotated, and the gear 39 that meshes with the gear 36 and is press fitted to the shaft 40 of the camera unit 8 is also rotated. Thus, the camera unit 8 is rotated around the shaft 40 and the shaft 45 (vertically rotated when the seat 6 is fixed to the ceiling).

When the adjustment jig 2 is mounted to the mount 1, the orientation of the camera unit 8 is adjusted by the adjustment jig 2, and then the adjustment jig 2 is detached from the mount 1, the pan brake 32 is pressed against the boss 25a of the bevel gear 25, and the tilt brake 42 is pressed against the gear 39 again. Thus, the orientation of the chassis 26 of the mount 1 is fixed, whereby the orientation of the camera unit 8 is fixed.

According to the present embodiment, the radio transmitting and receiving portion is mounted to the electric unit 14 of the adjustment jig 2, and thus the pan motor 16 and the tilt motor 17 can be driven from a distance by remote control. Thus, the adjustment operator can easily adjust the orientation of the camera unit 8 mounted to the ceiling or the like via the mount 1 from a distance, while watching a monitor or the like in a place distant from the camera unit 8.

When the orientation of the camera unit 8 is adjusted by the adjustment jig 2, and then the adjustment jig 2 is detached from the mount 1, the pawls 10 and the pawls 11 disposed in pairs on laterally opposite sides of the base plate 15 of the adjustment jig 2 are opened outward (see FIG. 3B). The adjustment jig 2 is urged by the spring 33 and the spring 43, and thus the adjustment jig 2 is released and detached from the mount 1. The pawls 10 and the pawls 11 are interlocked with the solenoid 18, and thus the solenoid 18 is driven to thereby enable the adjustment jig 2 to be detached from the mount 1 from a distance.

The mount 1 is configured such that, even when the pan brake 32 is not pressed against the boss 25a of the bevel gear 25 and the tilt brake 42 is not pressed against the gear 39, a slight friction is applied thereto. Therefore, the camera unit 8 is not vertically or horizontally rotated under the self weight of the camera unit 8 or the like.

As described above, according to the present embodiment, the adjustment jig 2 is mounted to the mount 1 into which the camera unit 8 is integrated, and the orientation of the camera unit 8 is adjusted by the adjustment jig 2 by remote control, and thus the adjustment can be performed alone. Further, fine adjustment of the orientation of the camera unit 8 can be easily performed by the adjustment jig 2 by remote control, and thus the adjustment can be performed extremely easily. Furthermore, a space area to be photographed can be properly photographed.

Next, a description will be given of a second embodiment of the present invention.

A second embodiment of the present invention is different from the first embodiment in the following points. Other elements in this embodiment are the same as those in the first embodiment, and descriptions thereof will be omitted.

In the first embodiment, the configuration has been described in which the camera unit 8 is integrated into the mount 1, and the mount 1 and the camera unit 8 cannot be easily separated from each other. On the other hand, in this embodiment, a configuration will be described in which the camera unit 8 is configured to be attachable to and detachable from a mounting plate described later rather than fixed to the chassis 26 so that the mount 1 and the camera unit 8 can be separated from each other.

Figure 8A:
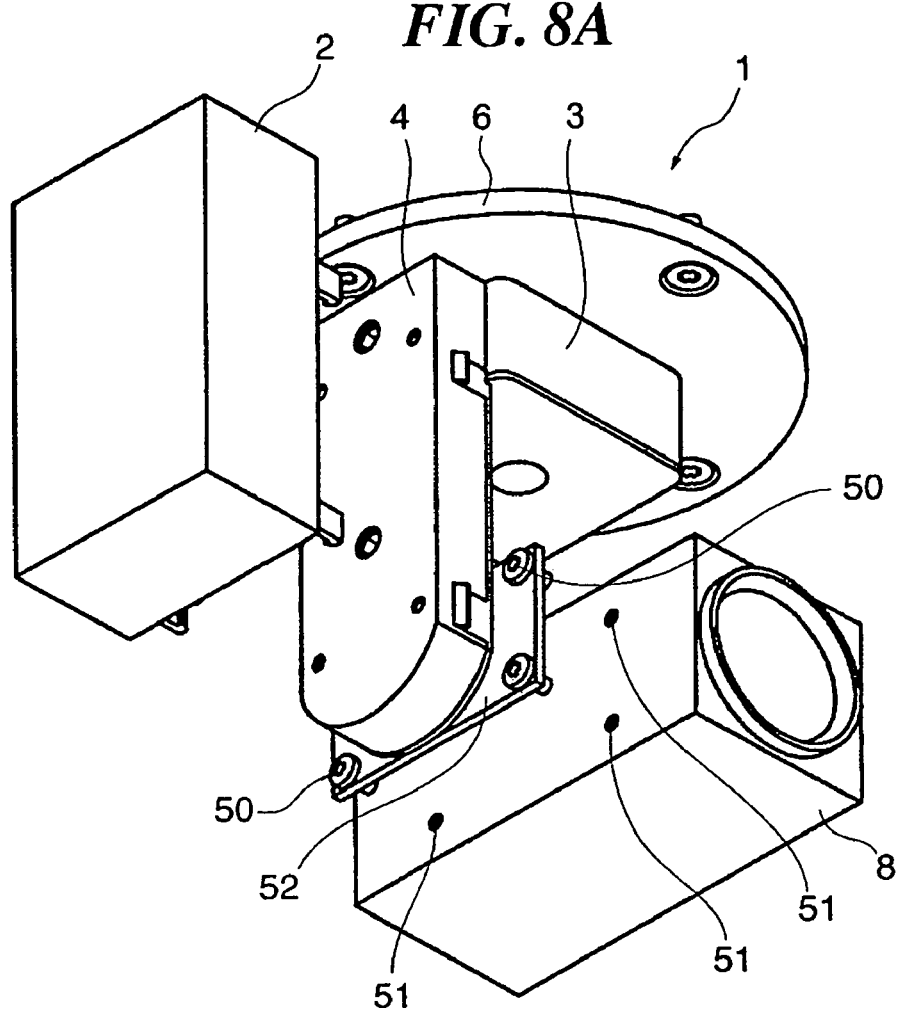
FIG. 8A is a perspective view of a mount as a device mounting apparatus, a camera unit as an image pickup apparatus with an adjustment mechanism, and an adjustment jig according to a second embodiment of the present invention, as viewed from the lower left.
Figure 8B:
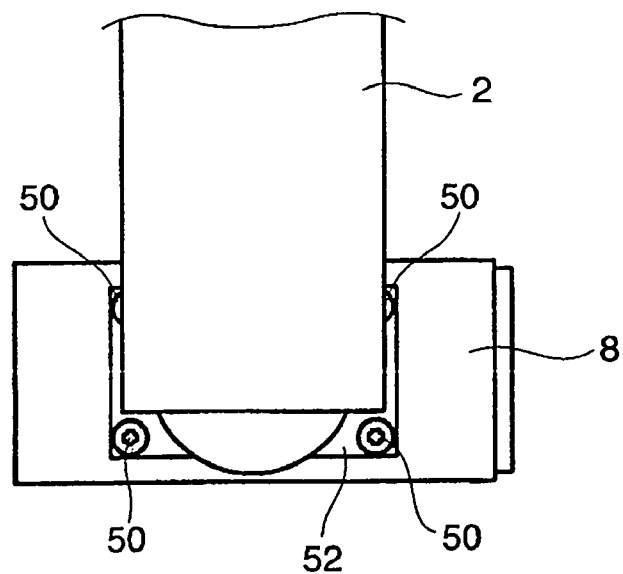
FIG. 8B is a side view of the mount, the camera unit, and the adjustment jig as viewed from the left.

FIG. 8A is a perspective view of the mount 1 as a device mounting apparatus, the camera unit 8 as an image pickup apparatus with an adjustment mechanism, and the adjustment jig 2 according to the second embodiment of the present invention, as viewed from the lower left, and FIG. 8B is a side view of the mount 1, the camera unit 8, and the adjustment jig 2 as viewed from the left.

In FIG. 8A and FIG. 8B, the mount 1 includes the upper cover 3, the side cover 4, the seat 6, and a mounting plate 52. The mounting plate 52 is fixed to the shaft 40 shown in FIG. 4. Screw holes are formed in four corners of the mounting plate 52, and screw holes 51 are formed in corresponding four places in a side surface of the camera unit 8. The camera unit 8 is fixed to the mounting plate 52 by screws 50. The structures of a horizontal rotation mechanism portion, a vertical rotation mechanism portion of the mount 1, and the adjustment jig 2 are the same as in the first embodiment, and descriptions thereof will be omitted.

As described above, according to the present embodiment, the adjustment jig 2 is mounted to the mount 1 to which the camera unit 8 is separatably mounted, and the orientation of the camera unit 8 is adjusted by the adjustment jig 2 by remote control, and thus the adjustment can be performed alone. Also, fine adjustment of the orientation of the camera unit 8 can be easily performed by the adjustment jig 2 by remote control, and thus the adjustment can be performed extremely easily. Further, a space area to be photographed can be properly photographed. Furthermore, the mount 1 and the camera unit 8 are separatable from each other via the mounting plate 52, and this enables the mount 1 to be adaptable to a plurality of kinds of camera units.

Although, in the first embodiment, the shaft 40 that supports the chassis 26 is rotated via the gear 36 for vertical rotation of the camera unit 8, the shaft 40 may be directly rotated by the adjustment jig 2. Similarly, although the shaft 27 rotatably inserted into the bevel gear 25 and fixed to the chassis 26 is rotated via the bevel gear 30 for horizontal rotation of the camera unit 8, the shaft 27 may be directly rotated by the adjustment jig 2. Reducing the number of gear portions in this way can reduce the number of components of the mount 1 and costs.

Although, in the first embodiment, the adjustment jig s is taken as an example that can adjust the orientation of the camera unit 8 in two directions of the direction substantially parallel to the surface of the base such as the ceiling or the wall to which the seat 6 is fixed and the direction substantially perpendicular to the surface of the base, the present invention is not limited to this. The present invention may be applied to an adjustment jig that can adjust the orientation of the camera unit 8 in any one of the direction substantially parallel to the surface of the base and the direction substantially perpendicular to the surface of the base.

Although, in the first and second embodiments, the case is taken as an example where the camera unit 8 is installed on the ceiling or the wall via the mount 1 and the orientation of the camera unit 8 is adjusted by the adjustment jig 2, the present invention is not limited to this. The present invention may be applied to the case where, for example, a light (an illumination apparatus) is installed on a ceiling or a wall via the mount 1 and the orientation of the light is adjusted by the adjustment jig 2.

This application claims the benefit of Japanese Application No. 2005-214897, filed Jul. 25, 2005, which is hereby incorporated by reference herein in its entirety.

What is claimed is:

1. A device mounting apparatus to which the device is selected from a group consisting of an image pickup apparatus and an illumination apparatus is mounted comprising:

a mount including a fixed unit fixed to a base, and a movable unit that is supported by said fixed unit and can change the orientation of the device relative to said fixed unit; and an adjustment jig that is attachable to and detachable from said mount and includes a driving unit generating transmitting driving force to said mount by operation and a shaft transmitting the driving force to said mount, wherein said movable unit includes a supporting unit that supports the device, a changing unit that changes the orientation of said movable unit according to the driving force from said adjustment jig when said adjustment jig is attached to said mount to cause said shaft to be inserted into said mount, and a fixing unit that fixes the orientation of said movable unit when said adjustment jig is detached from said mount to cause said shaft to be pulled out from said mount.

2. A device mounting apparatus according to claim 1, wherein said adjustment jig transmits at least one of first driving force and second driving force according to remote control, said changing unit includes a first rotation mechanism unit that rotates said supporting unit in a direction substantially parallel to a surface of the base in the first driving force when said adjustment jig is attached to said mount to cause said shaft to be inserted into said mount, and a second rotation mechanism unit that rotates said supporting unit in a direction substantially perpendicular to the surface of said base in the second driving force when said adjustment jig is attached to said mount, and said fixing unit includes a rotation preventing unit that prevents rotation of said supporting unit caused by said first rotation mechanism unit and said second rotation mechanism unit when said adjustment jig is detached to said mount to cause said shaft to be pulled out from said mount.

3. A device mounting apparatus according to claim 1, wherein the device is mounted to said mount by said supporting unit in a manner selected from the group consisting of a manner in which the device is integrated into said mount, and a manner in which the device is separatable from said mount.

* * * * *